Dec. 10, 1957     A. K. FERGUSON     2,815,871
WAREHOUSE SYSTEM
Filed May 27, 1954                             5 Sheets-Sheet 4
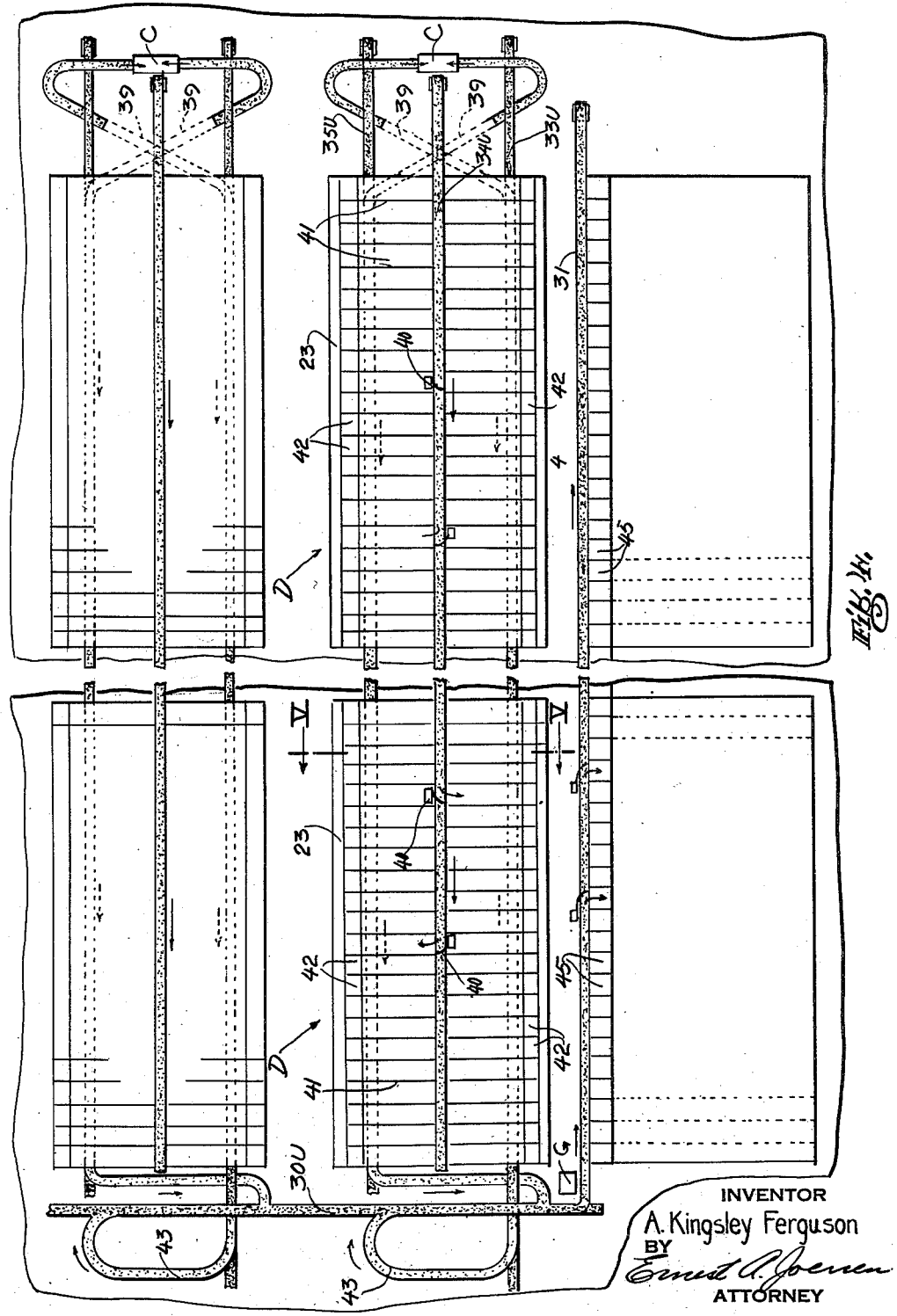
INVENTOR
A. Kingsley Ferguson
BY
Ernest A. Joerren
ATTORNEY

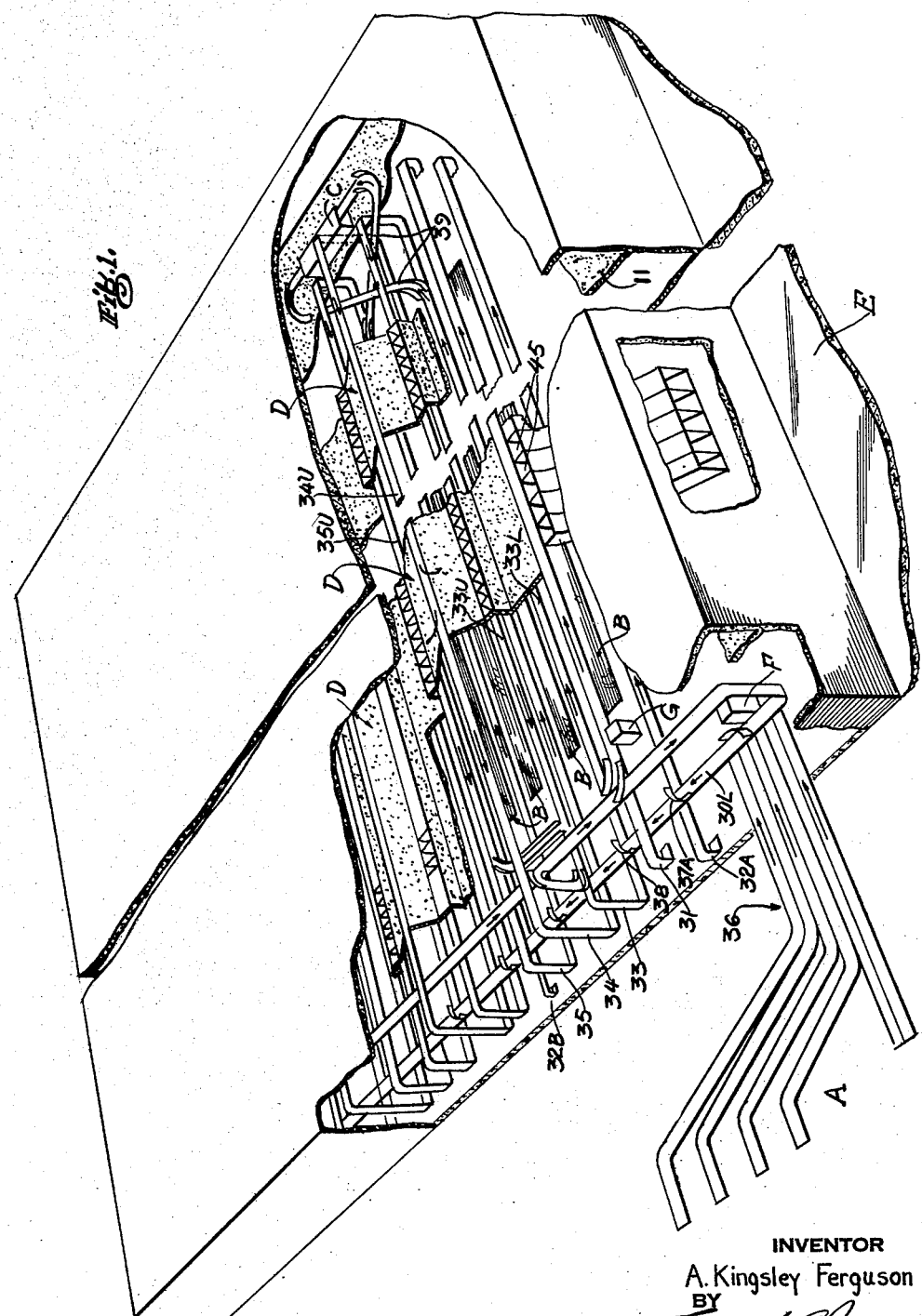

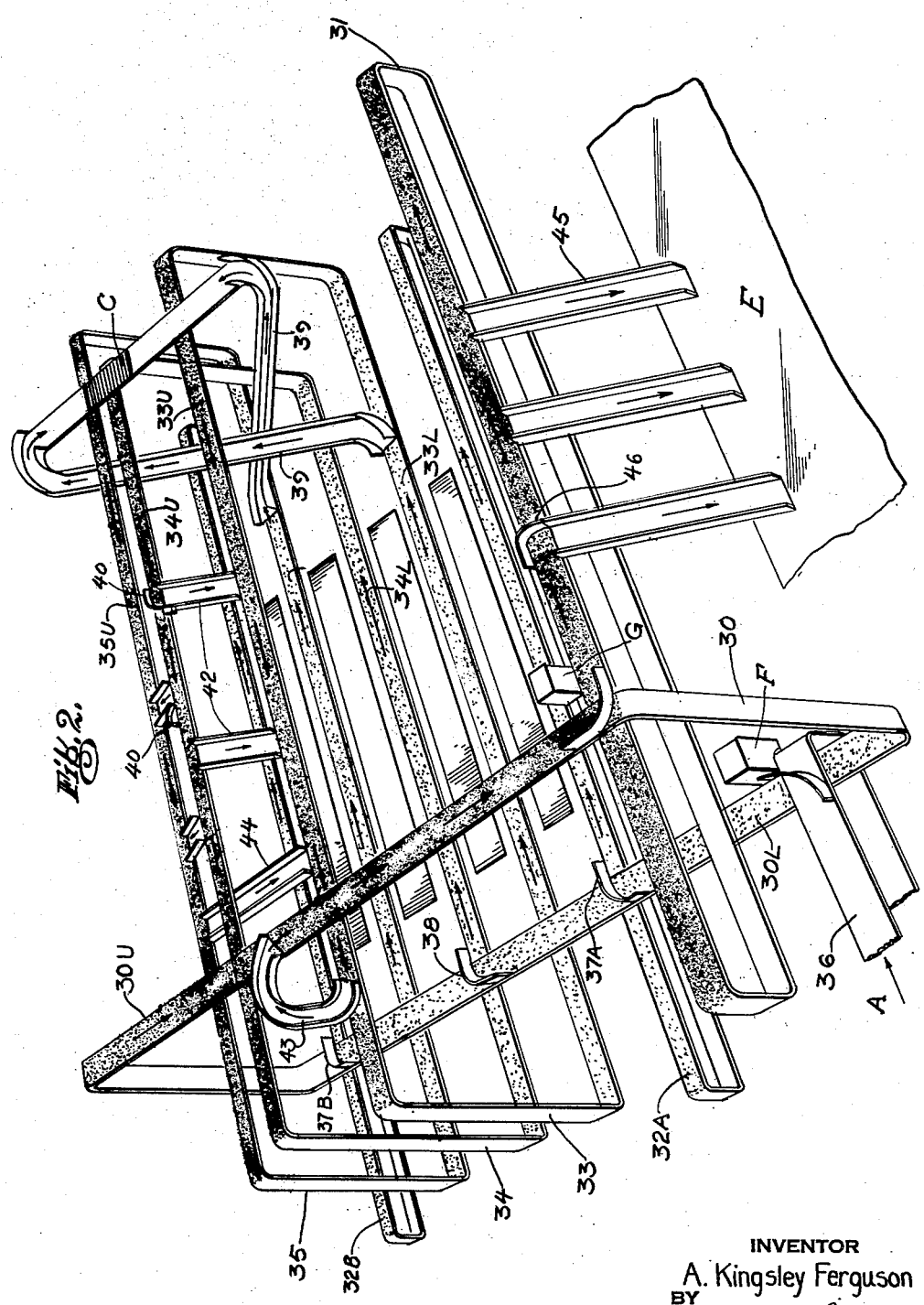

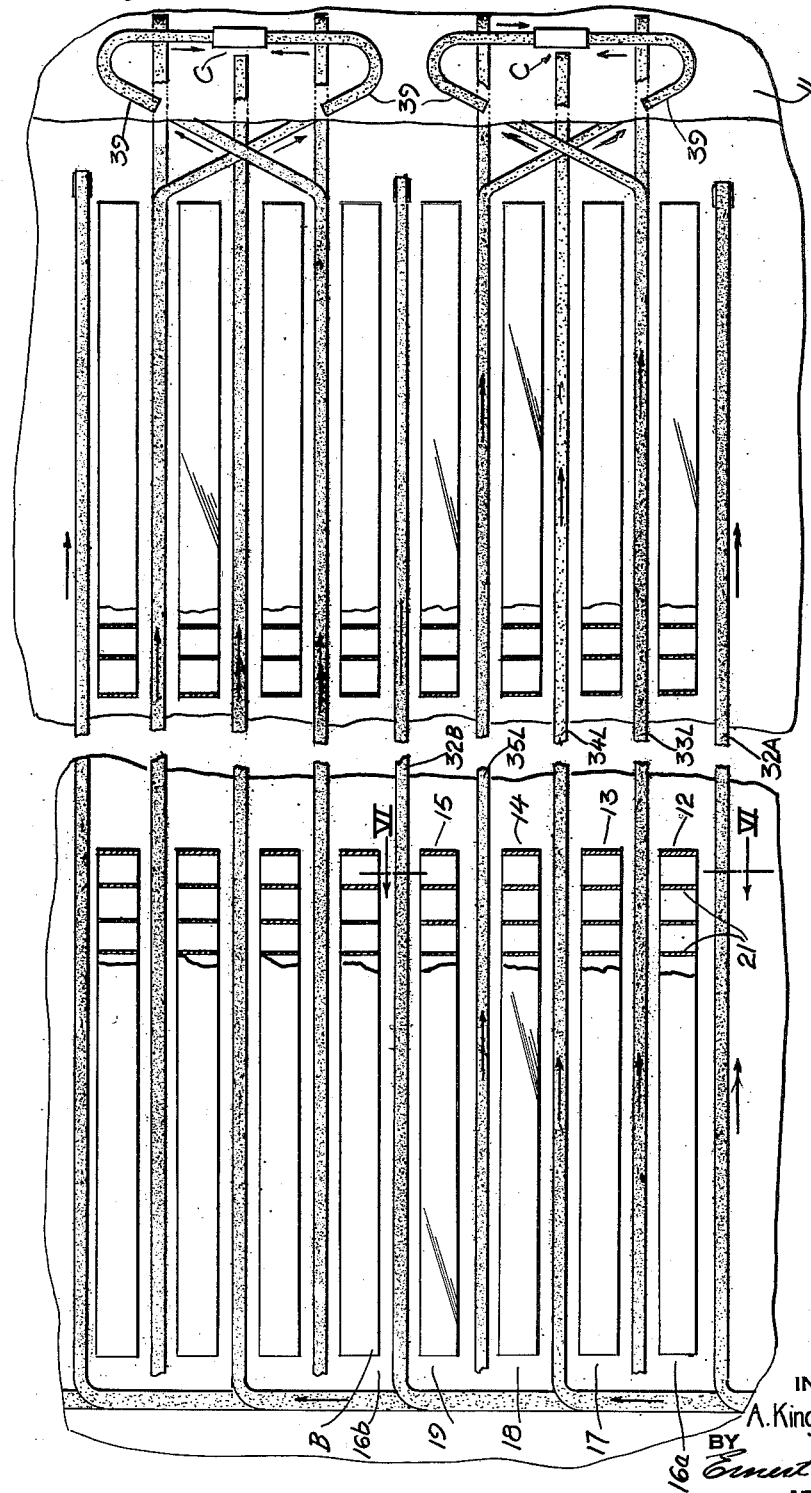

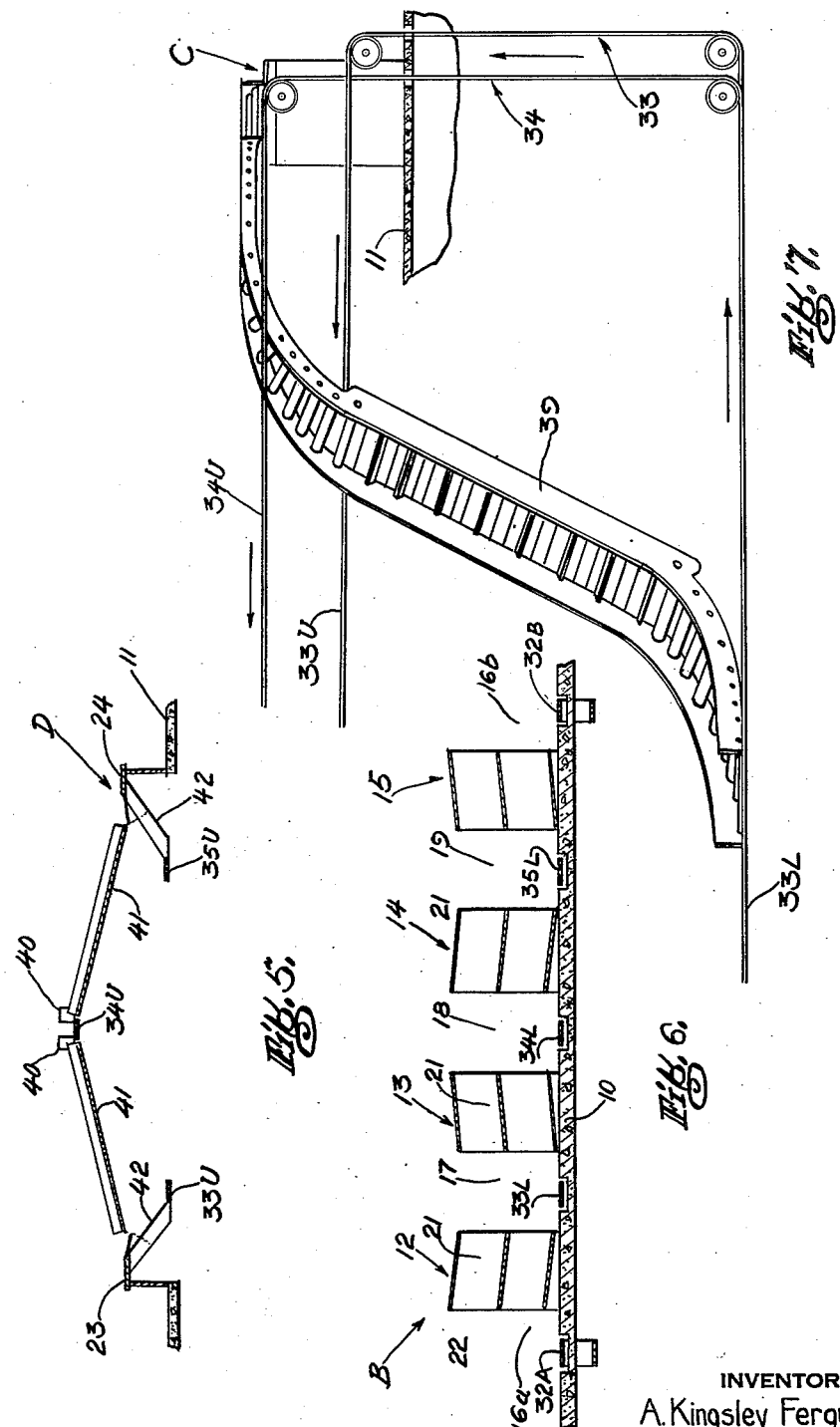

United States Patent Office 2,815,871
Patented Dec. 10, 1957

2,815,871

WAREHOUSE SYSTEM

A. Kingsley Ferguson, Westfield, N. J., assignor to Walter Kidde Constructors, Inc., New York, N. Y., a corporation of New York Application May 27, 1954, Serial No. 432,799

5 Claims. (Cl. 214—16)

The present invention relates to the operation of warehouses and similar places from which it is desired to distribute merchandise, and, more particularly, to a warehouse system for storing a large number of items and/or filling a large number of daily orders, although certain features thereof are applicable to other methods of warehouse operation.

The conventional method of operating a warehouse to distribute a very large number of items of merchandise therefrom comprises filling each order individually by sending a picker through the warehouse with a cart or basket, having the picker select and remove the various items from the proper bins, placing the items in the cart or basket, and delivering the items upon completion of the order to a packing area. This method is suitable where all the items ordered are relatively small in size and number, but, where some of the items are large in size or a large number of smaller items are required this method is not feasible because many trips through the warehouse would be necessary to fill each order.

It has been proposed to convey portable bins to the picker and have the picker remove therefrom the items required for each particular order. This is highly impractical where the number of items stored in the warehouse and ordered daily is very great because it would amount to moving almost the entire contents of a large warehouse many times each day. Mechanical means for moving the bins would be extremely complicated and costly, while moving the bins manually would require considerable labor and would result in traffic snarls and confusion.

It also has been proposed to wheel small automobile trailers through the warehouse, place the merchandise ordered by a particular store therein and then haul the trailer to the store desiring such items. This would require a warehouse with very wide aisles between storage bins which would increase the floor area to such an extent that the warehouse size and cost and the land cost or rental of the warehouse would be prohibitive.

It further has been proposed to provide bins from which merchandise is released automatically by the operation of an electrical device controllable from a central location, and to convey the various items making up an order to the packing area with or without automatic sorting of the items of each order. Such an arrangement would involve the use of numerous electrical circuits, electronic memory devices and automatic conveyor systems, would make it too complicated, costly and impractical in order to handle several thousands of items.

The present invention aims to provide an improved warehouse system which is not subject to the foregoing difficulties and disadvantages.

Accordingly, an object of the present invention is to provide a relatively simple and practical warehouse system adapted to be operated in a manner to fill daily orders for a large number of stores, such orders comprising items to be selected from thousands of items in storage.

Another object is to provide such a system which reduces the time and labor costs required to fill orders to a mimimum.

Another object is to provide such a system which, in part, is automatic in operation.

Another object is to provide such a system wherein a practical and economical conveyor arrangement is utilized.

A further object is to provide such a system wherein the various work locations are arranged in an improved manner.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description, and is shown in the accompanying drawings, forming a part of the specification, wherein:

Fig. 1 is a fragmentary schematic perspective view, with parts broken away for clearness, illustrating a warehouse embodying the present invention.

Fig. 2 is a schematic perspective view of a conveyor system for the warehouse illustrating one section thereof.

Fig. 3 is a fragmentary plan view of the lower level of the warehouse.

Fig. 4 is a fragmentary plan view of the upper level of the warehouse.

Fig. 5 is an enlarged sectional view taken along the line 5—5 on Fig. 4.

Fig. 6 is an enlarged sectional view taken along the line 6—6 on Fig. 3.

Fig. 7 is a fragmentary elevational view of conveyor mechanism for elevating articles from one level to another, such mechanism being shown schematically.

Referring to the drawings in detail, a warehouse is shown which comprises a lower floor 10 and an upper floor 11. This warehouse includes a receiving station A at one side of the lower floor, a plurality of rows of storage zones such as bins B on the lower floor arranged in one or more units, a sorting station C for each unit of bins located on the upper floor at the side of the warehouse opposite the receiving station side, packing stations D for each sorting station located on the upper floor, a shipping station E at a side of the warehouse adjacent the receiving station side, and a conveyor system for transferring articles into, through and out of the warehouse in the manner about to be described.

The term "articles" is used herein in a general sense to include individual articles, articles packed in bulk and articles placed in boxes, baskets or other receptacles to facilitate the handling thereof from the time the articles are withdrawn from the bins until they are packed for shipment.

The warehouse illustrated herein comprises several units of bins, for example five, each of which may be utilized for storing the class of articles for a particular department of a store. As shown in Figs. 3 and 6, each unit comprises four rows of a plurality of sections of bins 12, 13, 14 and 15, a loading aisle 16a at one side of the bins 12 ( at the left thereof as viewed in Fig. 6), a picking aisle 17 between the bins 12 and 13, a loading aisle 18 between the bins 13 and 14, a picking aisle 19 between the bins 14 and 15 and a loading aisle 16b at one side of the bins 15 (at the right thereof as viewed in Fig. 6).

The individual bins are separated by vertical walls 21, and are open at both sides thereof to provide an inlet end facing the loading aisle adjacent thereto and an outlet end facing the picking aisle thereto. The bins are provided with one or more shelves which preferably are inclined downwardly at a small angle from the inlet end to the outlet end to facilitate sliding of the articles towards the outlet end.

Each unit of bins has a pair of continuous rows of packing tables 23 and 24 associated therewith directly above the bins 12 and 15 (Figs. 4 and 5), each table having a number of locations for the purpose which will be made apparent hereinafter.

The conveyor system comprises a conveyor 30 at the receiving station side of the warehouse, a conveyor 31 at the shipping station side of the warehouse, and a plurality of spaced conveyors 32a, 33, 34, 35 and 32b for each unit of storage bins which are parallel to the conveyor 31 and at right angles to the conveyor 30. The conveyors 30, 33, 34 and 35 each have upper and lower strands (suffixed U and L, respectively) with the upper strand directly above the lower strand and with the upper strands passing through the space on the upper floor 11 and the lower strands passing through the space on the lower floor 10, whereby both strands of these conveyors can be utilized in the arrangement about to be described. Only the upper strands of the conveyors 31, 32A and 32B are used. While these conveyors are illustrated as belts herein, it will be understood that other types of endless conveyors having suitable upper and lower strand surfaces may be utilized.

As shown in Fig. 2, articles are adapted to be placed on the lower strand 30L at the receiving station A by means of conveyors 36, if desired, and these articles are transferred, by deflectors 37A, 38 and 37B, respectively, operated in the manner described hereinafter, to the lower strand of conveyors 34 and the upper strand of conveyors 32A and 32B, which extend through the loading aisles 16a, 18 and 16b. The articles are removed manually from these conveyor strands and are placed in the bins 12, 13, 14 and 15 through their loading or inlet ends.

The order pickers working in aisles 17 and 19 remove the articles desired from the outlet end of the bins and place the same on the lower strands 33L and 35L extending respectively through these aisles from the receiving station side to the sorting station side. Suitable conveyor mechanisms 39 (Fig. 7) remove the articles from the strands 33L and 35L and deliver the same to the sorting station C on the floor above.

After being sorted according to destination, the articles are placed on the upper conveyor strand 34U which extends between the packing tables 23 and 24 at a slightly higher level (Fig. 5) and are transferred from this conveyor strand to a specific packing location on the tables 23 and 24 by suitable deflectors 40 and chutes 41.

The articles are then packed in suitable boxes or containers and are delivered, by a chute 42 extending from a trap door in the packing tables 23 and 24, to the upper conveyor strands 33U and 35U respectively which extend under the tables just above the surface of the floor 11. The packed articles are moved to the receiving station side of the warehouse by these conveyor strands and are transferred therefrom to the upper conveyor strand 30U by conveyor means 43 and 44.

The packed articles are transferred from the conveyor strand 30U to the conveyor 31 which delivers the same to one of a series of chutes 45 each associated with a location at the shipping station where all packages for a given destination or route are collected and thereafter placed on a delivery truck. The packages are transferred from the conveyor 31 to the chutes 45 by deflectors 46.

While certain of the devices for transferring the articles or packages containing the same are illustrated more or less schematically, the function thereof is quite clear and it will be understood that varoius types of such devices which are adapted for such purposes are well known in the art and hence need not be described in detail. Certain of these devices are controlled manually and then operate automatically at a desired moment.

For example, the receiving station conveyors 36 deliver the incoming articles to a loading dispatching station F, where a dispatcher determines the bin location of such articles, places the same on the conveyor strand 30L and actuates a memory device of any well known type which causes a deflector 37A, 37B or 38 to move into position, the moment the articles arrive, and deflect the same onto a conveyor 32A, 32B or 34L passing through the bin location aisle of such articles.

Before the such articles are conveyed through the aisle where they are to be placed into bins for storage, the loading dispatcher alerts workers of their arrival by a public address system to enable the workers to be at the proper bin location and be prepared to remove the articles from the loading conveyors and place the same into the proper bins.

A similar memory device is under the control of a sorting dispatcher at the sorting station C for operating the deflectors 40. Likewise, a shipping dispatcher at a shipping dispatching station G, where the conveyor strand 30U and the conveyor 31 meet, controls such a memory device for actuating the deflectors 46.

The transfer conveyors 39 (Fig. 7), 43 and 44 (Figs. 2 and 4) are shown more or less schematically herein but the construction and operation of such mechanisms are well known in the art and need not be illustrated or described in further detail.

The warehouse illustrating the present invention is particularly adapted to be operated in a manner to handle 10,000 items and fill daily orders for 200 stores each having five departments; and to accomplish this, the warehouse has five units of bins each devoted to the items of a particular department, five units of packing stations each having 200 locations, one for each store, and a large number of shipping locations each devoted to one or more stores. However, certain features of such a warehouse can be used to good advantage in other warehouse arrangements, where the numerical product of items and daily orders is relatively high.

In operating the warehouse, all the orders to be filled on a given day are examined, and the total number of articles of like kind is placed on lists which are given to workers known as order pickers. Each picker receives a number of such lists for articles stored in the same bin aisle.

Lists are prepared indicating the store number and department thereof and the number of like items for each store ordered by a particular department of the store, and slips are prepared indicating the store number and the number of a particular item ordered by the stores. These lists and slips are given to the sorting station workers and duplicates thereof, sorted by store number, are given to the shipping station operators at the respective shipping locations.

The pickers then go into the picking aisles, remove the total number of like articles from the bins and place them on the conveyor strands 33L and 35L for delivery to the sorting station C. At this station, the sorters take the number of like items ordered by a given store and place them loosely in a box together with the slip identifying the particular store. The sorting dispatcher sees the slip, checks off the item from the store list and dispatches them to the packing location for the particular store. When the last item on the store list is checked off, this list is dispatched to the packing location and the packer at that location then knows his store order is complete and commences packing the various items for shipment.

Alternatively, sorting can be eliminated when an entire case of items is ordered. The case of items is then withdrawn from bins, is conveyed to the sorting table and is dispatched in its entirety to the packing station. In such instances, the picker places a card or slip on the box or case which travels therewith directly to the packer. Sorting thus is required only where the number of the items is less than that of a case lot.

The store list is affixed to the package and the package is conveyed to the shipping dispatcher, who notes the store number and dispatches the package to the shipping location for that store. The shipping clerk at each station checks off his store lists as they are satisfied by the packages received at his location, whereby when his lists for a particular store are completely satisfied he knows that the orders for all of the departments of that store have been filled and packaged and that such packages are at his location. The packages for that store are then placed on the truck covering the route on which the store is situated.

The foregoing takes place at all bins units, sorting stations, packing locations and shipping locations, so that when the last package is received at the shipping station all the orders for that day have been filled and the last truck is ready to depart.

In order to illustrate the foregoing operations more clearly by specific reference to stores, departments and items, but on a greatly simplified basis, the daily orders received by the warehouse from three stores 101, 102, and 103, each having two departments M and N, may comprise:

1. Store No. 101—
    Dept. M:
        Item 1000—10 pieces
            1001—10 pieces
            1002—10 pieces
    Dept. N:
        Item 2000—5 pieces
            2001—5 pieces
            2002—5 pieces
2. Store No. 102—
    Dept. M:
        Item 1000—10 pieces
            1001—10 pieces
            1003—10 pieces
    Dept. N:
        Item 2000—5 pieces
            2003—5 pieces
3. Store No. 103—
    Dept. M:
        Item 1001—10 pieces
    Dept. N:
        Item 2001—5 pieces These orders are examined and tabulated, and the following lists are prepared for the pickers working bin units M and N, these pickers being referred to hereinafter as pickers M and N, respectively:

1. Bin Unit M—Item 1000—20 pieces
    Store 100—10 pieces
        102—10 pieces
2. Bin Unit M—Item 1001—30 pieces
    Store 101—10 pieces
        102—10 pieces
        103—10 pieces
3. Bin Unit M—Item 1002—10 pieces
    Store 101—10 pieces
4. Bin Unit M—Item 1003—10 pieces
    Store 103—10 pieces
5. Bin Unit N—Item 2000—10 pieces
    Store 101—5 pieces
        102—5 pieces
6. Bin Unit N—Item 2001—10 pieces
    Store 101—5 pieces
        103—5 pieces
7. Bin Unit N—Item 2002—5 pieces
    Store 101—5 pieces
8. Bin Unit N—Item 2003—5 pieces
    Store 102—5 pieces Since each bin unit is devoted to a particular department and items in the 1000 and 2000 series are stored in adjacent bins in units M and N respectively, the picker M is given lists 1 to 4 and the picker N is given lists 5 to 8.

Lists are prepared, in duplicate, for the sorters and shippers to break down the orders according to store number and department. All the Dept. M lists are given to the sorter receiving articles from bin unit M, and all the Dept. N lists are given to the sorter receiving articles from bin unit N, these sorters being referred to hereinafter as sorters M and N, respectively. All the store 101, store 102 and store 103 lists are given to the three shippers at shipping locations 101, 102 and 103, respectively. Each sorter will have three lists and each shipper will have two lists in the example given.

For example, the sorters' and shippers' lists bear the following information:

1. Store No. 101, Dept. M:
    Item 1000—10 pieces
        1001—10 pieces
        1002—10 pieces
2. Store No. 102, Dept. M:
    Item 1000—10 pieces
        1001—10 pieces
        1003—10 pieces
3. Store No. 103, Dept. M:
    Item 1001—10 pieces
4. Store No. 101, Dept. N:
    Item 2000—5 pieces
        2001—5 pieces
        2002—5 pieces
5. Store No. 102, Dept. N:
    Item 2000—5 pieces
        2003—5 pieces
6. Store No. 103, Dept. N:
    Item 2001—5 pieces Copies of lists 1, 2 and 3 go to sorter M and copies of lists 4, 5 and 6 go to sorter N. Copies of lists 1 and 4, 2 and 5, and 3 and 6 go to shippers 101, 102, and 103, respectively.

Pickers M and N remove the number of pieces on their lists from the bins and forward the list with each group of like articles, and sorters M and N allocate these pieces according to store requirement on the pickers' lists Nos. 1 to 8. The example, 10 pieces of the 30 of item 1001 are segregated into three lots and dispatched to each of the packing locations 101M, 102M and 103M by dispatcher M; and 5 pieces of the 10 of item 2000 are segregated into two lots and dispatched to each of the packing locations 101N and 102N by dispatcher N. These items are checked off the sorters' lists Nos. 1, 2, 3, 4 and 5, respectively.

After all the items according to the pickers' lists have been sorted, the sorting dispatchers in noting that they are checking off the last item on a given store list, forward this list to the packers with the last item. For example, the packer at location 102M now has received the proper number of pieces of items 1000, 1001 and 1003 for store No. 102 and packages the same; while the packer at location 102N also has received the proper number of pieces of items 2000 and 2003 for store No. 102 and likewise packages the same. Store list No. 2 is affixed to the package at packing location 102M to identify the package as No. 102M and store list No. 5 is affixed to the package at packing location 102N to identify the package as No. 102N.

Packages Nos. 102M and 102N are conveyed to the shipping dispatcher who dispatches them to shipping location 102. The shipper at this location, in checking off his store lists Nos. 2 and 5, notes that he has received all the packages for store 102, and proceeds with the loading of the truck which delivers these packages to store 102.

From the foregoing description, it will be seen that the method of warehousing of this invention enables a large number of orders for a large number of stores to be picked from a huge number of items and thereafter sorted, packaged and segregated for shipping in a relatively simple manner which involves a minimum of labor costs and equipment.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In a warehouse, the combination of building structure having an upper and a lower floor, at least two pairs of parallel rows of storage bins on the lower floor arranged to provide an aisle between adjacent rows of bins and said bins being so constructed that the aisles alternately are utilized as picking and loading aisles commencing with a picking aisle, conveyors each having a lower run passing through one of the aisles with the conveyor for a picking aisle having its upper run passing above the second floor directly above its lower run and with the conveyor for a loading aisle passing above the second floor at a substantial elevation above the floor level and directly above its lower run, a pair of rows of packing tables for each pair of upper runs of picking aisle conveyors with each row parallel to and located outwardly and above such upper run, and a row of chutes extending from the upper run of the conveyor for a loading aisle to each row of tables, said tables being arranged to provide openings for access to the upper runs of the picking aisle conveyors.

2. In a warehouse according to claim 1, wherein chutes extend from said openings to the upper runs of the picking aisle conveyors.

3. In a warehouse according to claim 1, wherein conveyor means are provided for transferring articles from the lower run of two adjacent picking aisle conveyors to the upper run of a loading aisle conveyor between said two conveyors.

4. In a warehouse according to claim 1, wherein a conveyor is provided at one end of the rows of bins and packing tables extending cross-wise with respect to said aforementioned conveyors and having a lower run adjacent the lower run of the conveyor for a loading aisle and having an upper run adjacent the upper runs of the picking aisle conveyors.

5. In a warehouse according to claim 4, wherein said building structure includes a shipping station at one side of the warehouse and a conveyor has a run extending from the upper run of said cross-wise extending conveyor to said shipping station.

References Cited in the file of this patent

UNITED STATES PATENTS

| | | |
|---|---|---|
| 1,093,815 | Whittier | Apr. 21, 1914 |
| 1,357,315 | Dupuy | Nov. 2, 1920 |
| 1,369,502 | True | Feb. 22, 1921 |
| 1,439,825 | Kuhn et al. | Dec. 26, 1922 |
| 1,502,326 | Bauer | July 22, 1924 |
| 1,557,100 | Shields | Oct. 13, 1925 |
| 1,616,693 | Havighorst | Feb. 8, 1927 |
| 1,710,969 | Dempsey | Apr. 30, 1929 |
| 2,134,948 | Lienau et al. | Nov. 1, 1938 |
| 2,353,394 | Farmer | July 11, 1944 |
| 2,353,638 | Beaulieu et al. | July 18, 1944 |
| 2,503,864 | Carter | Apr. 11, 1950 |
| 2,564,056 | Fahey | Aug. 14, 1951 |
| 2,640,607 | De Burgh | June 2, 1953 |